United States Patent
Böhm

(10) Patent No.: US 7,017,442 B2
(45) Date of Patent: Mar. 28, 2006

(54) PARKING BRAKE

(75) Inventor: Markus Böhm, Remscheid (DE)

(73) Assignee: Edscha AG, Remscheid (DE)

( * ) Notice: Subject to any disclaimer, the term of this patent is extended or adjusted under 35 U.S.C. 154(b) by 7 days.

(21) Appl. No.: 10/297,866

(22) PCT Filed: Jun. 12, 2001

(86) PCT No.: PCT/DE01/02206

§ 371 (c)(1),
(2), (4) Date: Dec. 9, 2002

(87) PCT Pub. No.: WO01/96162

PCT Pub. Date: Dec. 20, 2001

(65) Prior Publication Data

US 2004/0035239 A1    Feb. 26, 2004

(30) Foreign Application Priority Data

Jun. 16, 2000   (DE) ................. 100 29 750

(51) Int. Cl.
*G05G 1/14* (2006.01)
(52) U.S. Cl. ............... 74/512; 74/513; 74/560
(58) Field of Classification Search ........ 74/512, 74/513, 560, 478, 491, 56
See application file for complete search history.

(56) References Cited

U.S. PATENT DOCUMENTS

| | | | | |
|---|---|---|---|---|
| 2,977,818 A | * | 4/1961 | Strozik | 74/531 |
| 3,375,731 A | * | 4/1968 | Lacroix | 74/516 |
| 3,733,966 A | * | 5/1973 | Brown, Jr. | 91/372 |
| 3,741,033 A | * | 6/1973 | Wilke et al. | 74/512 |
| 3,911,760 A | * | 10/1975 | Elbers et al. | 74/512 |
| 4,149,433 A | | 4/1979 | Schroeter | 74/516 |
| 4,224,832 A | * | 9/1980 | Prohaska et al. | 74/388 R |
| 4,364,284 A | * | 12/1982 | Tani et al. | 74/540 |
| 4,615,235 A | * | 10/1986 | Horvath | 74/516 |
| 5,022,477 A | * | 6/1991 | Wanie | 180/6.34 |
| 5,182,963 A | | 2/1993 | Perisho et al. | 74/512 |
| 5,832,784 A | * | 11/1998 | McCallips et al. | 74/512 |
| 5,855,143 A | * | 1/1999 | Ewing | 74/512 |
| 6,105,459 A | * | 8/2000 | Troiano | 74/542 |
| 6,212,970 B1 | * | 4/2001 | Bortolon | 74/512 |
| 2004/0129106 A1 | * | 7/2004 | Prat et al. | 74/512 |
| 2004/0250646 A1 | * | 12/2004 | Smith et al. | 74/512 |

FOREIGN PATENT DOCUMENTS

| | | |
|---|---|---|
| DE | 3427416 A1 * | 2/1986 |
| DE | 3528568 | 1/1987 |
| DE | 3706545 | 9/1988 |
| DE | 29806949 | 7/1998 |
| DE | 19851419 | 5/2000 |
| EP | 0706922 | 4/1996 |
| JP | 01141154 | 6/1989 |
| JP | 11115701 | 4/1999 |

* cited by examiner

*Primary Examiner*—Vinh T. Luong
(74) *Attorney, Agent, or Firm*—Davidson, Davidson & Kappel, LLC

(57) ABSTRACT

A parking brake for a motor vehicle includes a lever holder, a brake actuation lever disposed in an articulated manner on the lever holder, a brake cable, and a coupling unit for tensioning the brake cable when the brake actuation lever is displaced. The parking brake also includes a locking device for holding the brake actuation lever in a locking position, and a four-bar mechanism including two nonparallel links for linking the brake actuation lever with the lever holder.

16 Claims, 4 Drawing Sheets

PARKING BRAKE

BACKGROUND OF THE INVENTION

The invention relates to a parking brake for a vehicle comprising a brake actuation lever which is arranged in an articulated manner on a lever holder, a coupling unit which tensions a brake cable during the displacement of the brake actuation lever, and a locking device in order to hold the brake actuation lever in a locking position.

Parking brakes are known from practice which are embodied selectively as a foot-operated or as a hand-operated unit for a motor vehicle and which have a brake actuation lever which is arranged in an articulated manner on a lever holder fixed to the body, the brake actuation lever being capable of being fixed to the lever holder in different pull-up positions via a locking device and acting, as a function of its pull-up angle, on a brake cable which is coupled to the brake actuation lever via a coupling unit and which tensions brake shoes in the region of the wheels of the vehicle. The articulated connection between the brake actuation lever and the lever holder takes place in this case via a pin which connects corresponding bores in said parts to one another in a pivotally articulated manner. One disadvantage of such known parking brakes is that the transmission ratio between the pivoting angle of the brake actuation lever and the coupling unit of the brake cable is constant, so that it has already been proposed to integrate into the brake cable assembly tension members which define a transmission ratio. A further disadvantage is that, in the case of a hand-operated parking brake, the ergonomic levers for actuating the brake actuation lever become detectably poorer with an increasingly pulled-up brake actuation lever, so that the necessary moments require a marked increase in force, particularly in the direction of the end of the pivoting range of the brake actuation lever. Even in the case of foot-operated parking brakes, there is the disadvantage that the pedal arranged on the brake actuation lever for the action of force provides, when it pivots about a single joint, a decreasing effective pedal surface which reduces the available loading arm particularly in the range of increasing forces.

DE-A 37 06 545 describes a hand lever device for a motor vehicle, in particular a motorized two-wheeler, in which a grip part of the hand lever is held at least approximately parallel to a grip on the handlebar and has a guide in order to allow an approximately parallel displacement of the grip part. The guide is designed as an articulated mechanism in the manner of a four-bar mechanism or as a double-crank mechanism. A locking possibility is not provided.

DE-C 35 28 568 describes a parking brake device for a motor vehicle, in which a brake actuation lever is arranged in an articulated manner on a lever holder and has a grip which is of essentially convex design and which is arranged transversely to the lever holder, wherein, furthermore, a release device assigned to a locking device and having an actuating knob is provided in the end region of the brake actuation lever.

SUMMARY OF THE INVENTION

An object of the invention is to provide a parking brake that makes it possible to pull up a brake cable reliably.

The parking brake according to the invention makes it possible, by means of the articulated connection of the brake actuation lever to the lever holder via a multiple joint, to transmit the moment acting on the brake actuation lever to the coupling unit for the brake cable indirectly, so that the forces to be applied can undergo a change as a function of the adjustment of the brake actuation lever. It is particularly advantageous to design the multiple joint as a four-bar mechanism comprising a first and a second link which are in each case pivotally mounted at their one end on the brake actuation lever and at their second end on the lever holder. It thereby becomes possible for the brake actuation lever to be pivoted about an instantaneous center of rotation outside the lever holder, with the result that the forces and moments effective for the user are ergonomically significantly more favorable. In particular, for applying the force in order to actuate the brake cable, it is possible to provide a transmission ratio, so that the lever effects due to the brake actuation lever can be utilized in a way other than has been known hitherto.

Expediently, the coupling unit for the brake cable is arranged on one of the two links, the articulation of the coupling unit expediently being provided at a distance from the articulation of the link joint located on the lever-holder side, so that the distance between the two articulations defines the lever arm by which the brake cable is displaced concentrically. In order to design a parking brake which acts in the usual way, there is provision for the articulation of the brake cable to be provided on an extension or a prolongation of the link, which extension or prolongation is displaced opposite to the outgoing direction of the brake cable when the brake actuation lever is increasingly pulled up. This articulation may be provided selectively on the short or on the long link of the four-bar mechanism, but it is preferably provided on the rear link, in order to keep the brake cable as short as possible and, moreover, provide installation conditions similar to those for conventional parking brakes.

To secure the parking brake in a pulled-up angular position of the brake actuation lever in relation to the lever holder, a locking device is provided, comprising a pretensioned latching unit which, by means of a toothed quadrant, can fix the brake actuation lever and the lever holder in different positions in relation to one another. It is possible, on the one hand, to arrange the toothed quadrant on the rigid part, here the lever holder, and to provide the latching unit, pretensioned in the direction of the toothed quadrant, on one of the movable parts, selectively the brake actuation lever itself or one of the links of the multiple joint. In principle, this arrangement may also be kinematically reversed, to the effect that a latching element, for example a circumferentially toothed wheel, is arranged on the fixed part, here the lever holder, and can be brought into engagement with a toothed quadrant on the movable part, the locking device then being assigned means for securing the latching element which have to be cancelled separately.

It is particularly preferred to arrange the pretensioned latching unit, preferably in the form of a latching pawl provided with an engagement nose, on one of the links of the multiple joint, since these, by virtue of their articulated connection to the lever holder, can be provided in a favorable way in the vicinity of a toothed quadrant provided there. Preferably, for this purpose, that link is selected on which the coupling unit for the brake cable also engages, so that the forces acting on the parking brake by means of the brake cable do not have to be transmitted to the locking device via the various joints, but act directly on the same structural part, with the other joints being relieved. It is thereby possible to design the other link for lower loads, since said link assumes essentially the guidance, particularly in the case of the embodiment as a four-bar mechanism, while the forces are absorbed in the preferably rear link.

It is particularly advantageous if the bearing point of the coupling unit of the brake cable at the same time supports the mounting of the latching device of the locking device since a bearing point is thereby saved, but, at the same time, there is a particularly low risk of the latching device being torn out, since merely the distance of the latching nose from the bearing point defines a lever arm for the stress of forces and moments caused by the brake cable. It is thereby possible to provide a relatively weak spring for pretensioning the latching member, with the result that the generation of noise for locking the parking brake is agreeably reduced.

In the design of the parking brake with the four-bar mechanism, preferably the two links are arranged in such a way that they can pivot past one another. This is possible, for example, in that one of the two links is at a somewhat greater distance from the lever holder than the other, or in that the lever holder, when it is designed as a rising bridge element, supports a link on each of the two sides. It is particularly preferred to have an embodiment of the lever holder in which the latter comprises two essentially vertical walls which are at a distance from one another and which between them receive one of the two links in an articulated manner. The other link may be provided on an outside of one of the two walls, but preferably a link is provided on each of the two sides, on the outsides of the walls, so that one link of the four-bar mechanism is provided in duplicate. The link received centrally, which is preferably the rear link, may then be designed for the absorption of greater forces which can receive the coupling unit for a brake cable centrally without adverse moments. Particularly in the case of a four-bar mechanism hinge, alternatively to the above-described securing of the movable parts relative to the lever holder, a securing of two movable parts in relation to one another may also be carried out, with the result that the brake actuation lever can likewise be secured in its pull-up position. Thus, for example, it is possible to fix the two links releasably in relation to one another or else to secure one of the two links relative to the brake actuation lever via a locking device. It is possible, in particular, to couple two locking devices and thereby provide increased safety in the securing of the parking brake, and, in particular, two intermittently latching locking devices can thereby give rise to a larger number of locking positions, with the toothings nevertheless being of robust construction.

The locking device is preferably assigned a release device which can be triggered, for example, via a compression spring and which frees the locking device during actuation, so that the brake actuation lever is displaced back into its laid-down position as a result of the cable forces. In the case of a hand-operated parking brake, the release device will expediently be arranged in the end region of the brake actuation lever by means of an actuating knob, but it is possible to arrange said release device outside the parking brake, as is customary in particular in the case of foot-operated parking brakes.

A particularly preferred feature of the invention is that the brake actuation lever has an essentially flat shape which, with the brake actuation lever laid down, may, for example, be designed at the same time as an armrest. The end region of the brake actuation lever may then have a convex shape which allows the human hand to grasp it in an ergonomically particularly favorable way, so that the fingertips grasp the handle under it and the transmission of force to the brake actuation lever is particularly favorable.

Further advantages and features of the invention may be gathered from the following description and from the claims.

BRIEF DESCRIPTION OF THE DRAWINGS

The invention is explained in more detail below by means of a preferred exemplary embodiment, with reference to the accompanying drawings.

DETAILED DESCRIPTION

Figure 1:
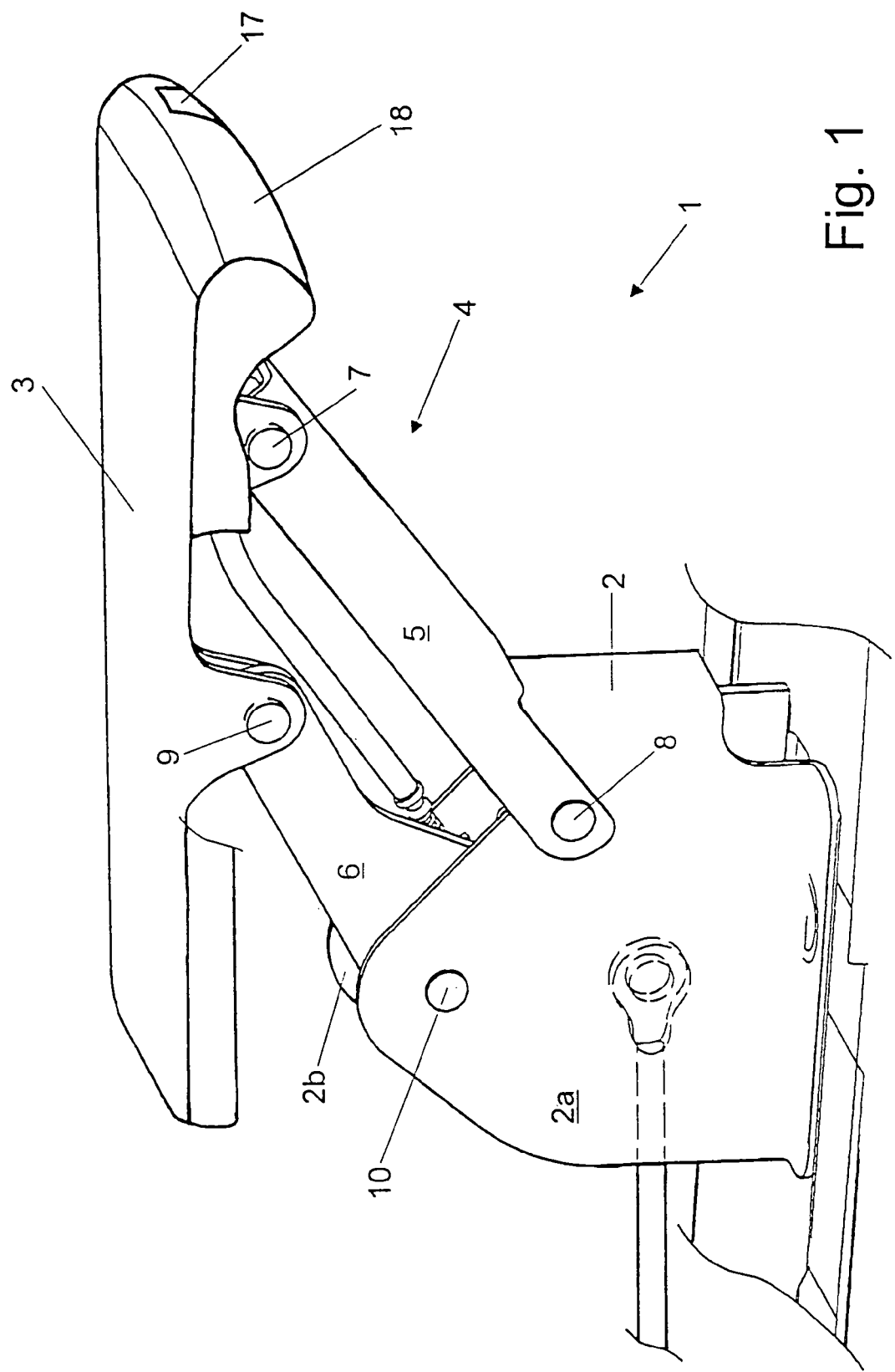
FIG. 1 shows a perspective view of a preferred exemplary embodiment of a parking brake according to the invention.

The parking brake illustrated in FIGS. 1 to 4 and designated in general by 1 is a hand-operated parking brake in a passenger car, which arranges a brake actuation lever 3 by means of a multiple joint 4, which is designed in the present case as a four-bar mechanism, on a lever holder 2 which is designed in the manner of a bridge girder and is arranged fixed to the body, and which projects essentially perpendicularly from the body. The four-bar mechanism 4 comprises a front link 5 and a rear (aft) link 6 which are in each case articulated, on the one hand, on the lever holder 2 and, on the other hand, on the brake actuation lever 3 via joints 7, 8 and 9, 10 respectively. It can be seen that the distance between the joints 7 and 8 is greater than that between the joints 9 and 10, so that the link 5 has a greater effective length than the link 6. As a result, the four-bar mechanism 4 defines an instantaneous center of rotation as an apparent pivot axis of the brake actuation lever 3 about the lever holder 2, said pivot axis lying further to the rear than the lever holder 2. The axes of the four-bar mechanisms 7, 8 and 9, 10 run horizontally and are essentially parallel to one another.

Figure 2:
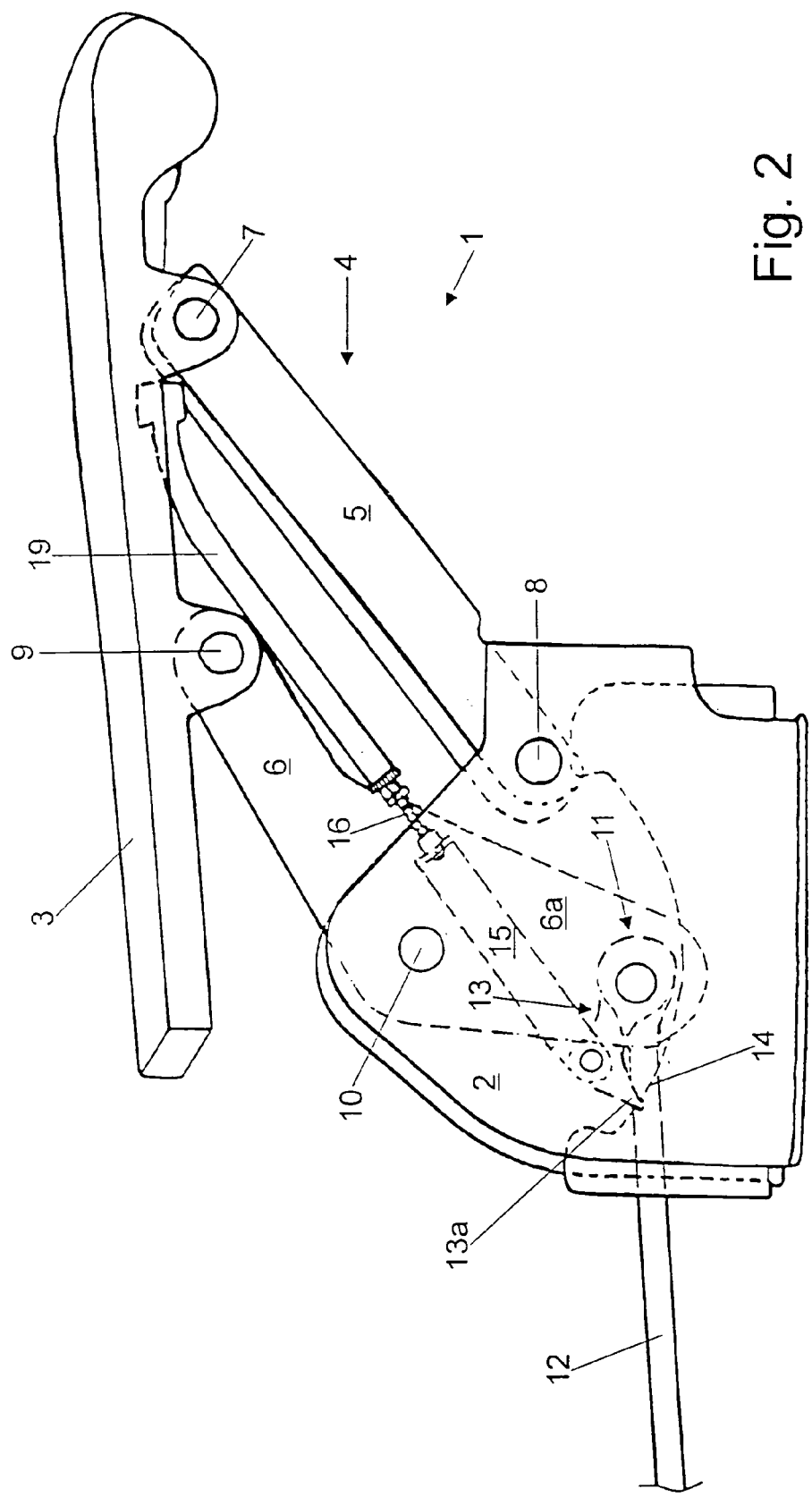
FIG. 2 shows a side view of the parking brake from FIG. 1.
Figure 3:
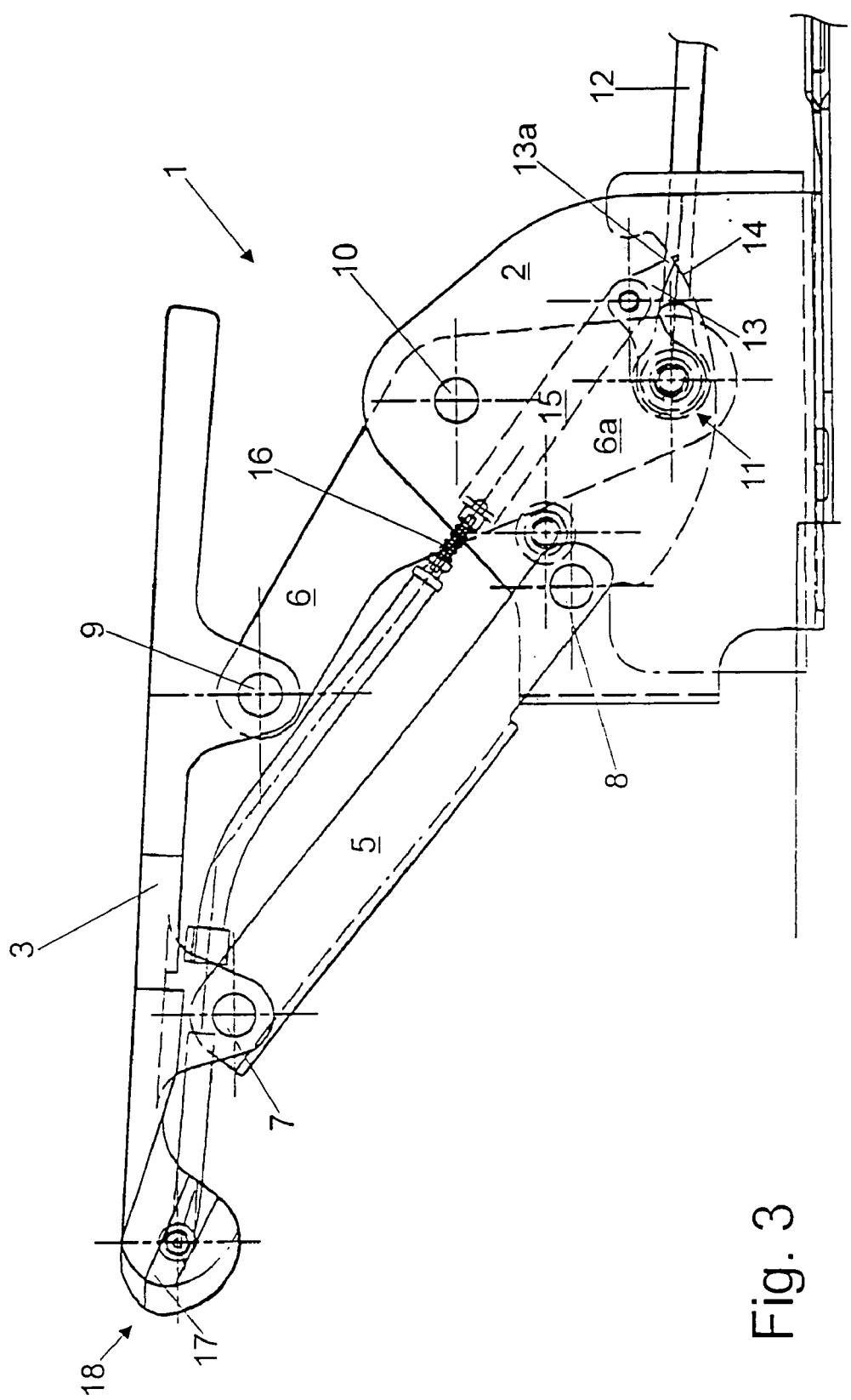
FIG. 3 shows a side view from the other side of the parking brake from FIGS. 1 and 2.
Figure 4:
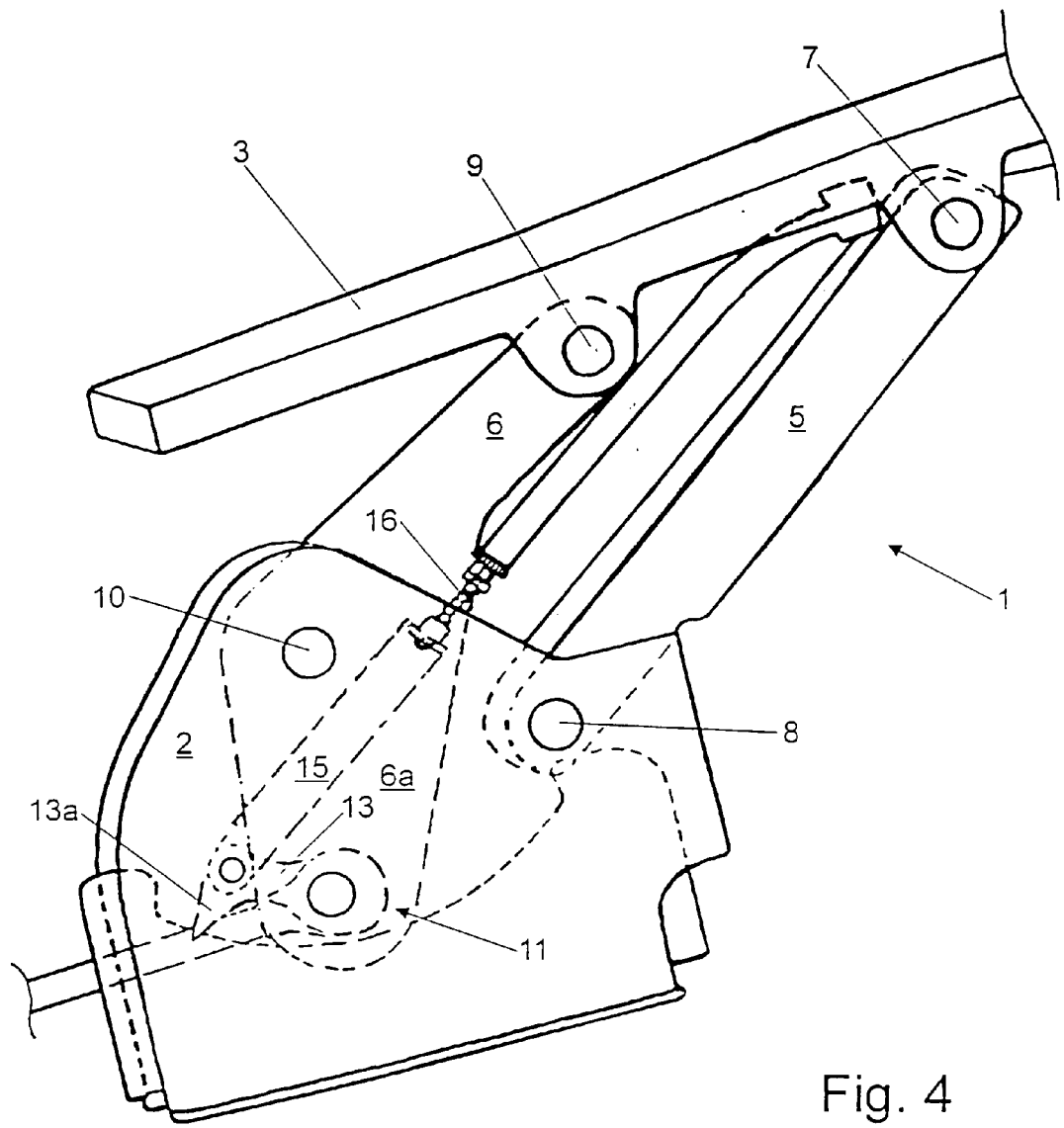
FIG. 4 shows an enlarged detail of the parking brake of FIG. 1 to 3.

As can clearly be seen particularly in FIG. 2, the link 6 has an extension 6a which gives the link 6 a shape similar to that of a triangle, there being arranged in the third end of the link 6 a coupling unit 11 for a brake cable 12 which acts on the brake cylinders in the region of the rear axle of the passenger car. By the brake actuation lever 3 being pulled up, the link 6 is pivoted relative to the joint 10 according to the path curve defined together with that on the front link, so that the region 6a of the link 6 is likewise pivoted about the articulation or joint 10 through the same angle as the link 6, and the coupling unit 11 for the brake cable 12 is pivoted correspondingly forward about the joint 10 on a path in the form of a segment of a circle, tension thus being transmitted to the brake cylinders (not illustrated). It may be noted that the moment applied to the brake actuation lever 3 by virtue of the pull-up of the brake actuation lever 3 due to the action of the human hand is not transmitted in direct proportion to the distances to the joint 10, but, instead, is additionally influenced according to the effective length of the link 6 due to the articulation in the form of a four-bar mechanism 4. It is possible to influence this transmission ratio even further by one or both links 5, 6 being divided in suitable form, for example by means of an intermediate joint, so as effectively to give rise to a double four-bar mechanism, or by means of other suitable multiple joint combinations.

Likewise, articulated pivotably in the extension 6a of the link 6 and, in the present case, on the same mounting is a latching unit 13 which is pretensioned with a latching nose 13a in the direction of a toothed quadrant 14 provided in the bottom of the lever holder 2 and taking the form of a segment of a circular path. The latching unit 13 and the toothed quadrant 14 define a locking device for the parking brake 1, the pretension of the latching unit 13 being applied via a torsion spring (not illustrated) which is supported, on the one hand, on the extension 6a of the link 6, and, on the other hand, on the latching unit 13. The latching unit 13 is connected in an articulated manner, at a distance from the articulation at 11, to a guide tappet 15 which, by a compression spring 16 being overcome in the case of the manual actuation of a release knob 17 integrated in a grip 18 in the front region of the brake actuation lever 3, can be shifted out of the pretensioned locking position in engagement by means of the latching nose 13a with the toothed quadrant 14 into a release position. The release knob 17 is connected to the tappet member 15 via a push rod 19 and the compression spring 16 which is guided along in the region between the links 5 and 6. The locking device 13, 14 functions in a way known per se, so that there is no need to deal with this any further. Alternatively, it would be possible to design the circumferential region 6a of the link 6 with a toothing and to articulate a latching unit on the lever holder 2 in order to achieve the same locking.

As can be seen clearly in FIG. 1, the brake actuation lever 3, with its side facing upward, is designed, adjacently to its convex grip 18 adapted to the shape of a hand, so as to be essentially flat, while the top side may have a pad and extends further to the rear than is absolutely necessary for the articulation 7, 9 of the links 5, 6. It is possible to supplement the part required for the transmission of forces and moments by a second part separate from this, said parts being designed, if appropriate, to be demountable. The four-bar mechanism, as well as the uncladded push rod 19, are thereby concealed from the user in an esthetically favorable way. It has to be understood that the region below the brake actuation lever 3 can be protected from view by a flexible cladding. In an essentially horizontally arranged position of the brake actuation lever 3, the parking brake is laid down, and the flat surface is also suitable for resting the elbow during travel, or, if appropriate, also for the temporary stacking of drinks cups and the like.

The lever holder 2 is formed from two vertically rising walls 2a, 2b which extend essentially in the direction of travel and define an inner space, in which the portion carrying the toothed quadrant 14 is held in the region of the bottom. The link 6 is likewise held between the walls 2a, 2b while the link 5 is arranged on the outside of the wall 2a. It is possible to provide a further link 5, parallel to the first link 5, on the outside of the other wall 2b. The walls 2a, 2b of the lever holder 2 can be produced by the folding of a sheet-metal part, so that the two walls are connected to one another in the front region, while the region for the outgoing of the brake cable 12 is at least partially perforated to the rear for this purpose.

The parking brake 1 operates as follows:

Starting from the laid-down position, as indicated in FIG. 1, the brake actuation lever 3 is pulled up preferably by the grip 18 being grasped and is displaced upward, with the result that the brake cable 12, which is coupled to the extension 6a of the link 6, is tensioned via the four-bar mechanism 4 and, in particular, via the pulling force acting relatively on the joint 10. During the tensioning operation, the latching nose 13a of the latching unit 13 in each case overcomes a row of teeth of the toothing 14 counter to the pretension of the associated tension spring and detains the brake actuation lever 3 after the end of the pulling-up operation. By means of the corresponding pull on the brake cable 12, the brake cylinders 12 are then pulled up and the vehicle is braked. When the release knob 17 is actuated, the latching nose 13a of the latching unit 13 is brought out of engagement with the toothing 14, and, under the load of the brake cylinders acting on the brake cable 12, the brake actuation lever is brought back into its initial position via the links 5, 6, so that the braking position of the vehicle is cancelled.

The invention was described above with reference to a brake cable as a transmission member to associated brake shoes. It has to be understood that linkage portions or adjustment devices may additionally be provided. Furthermore, it has to be understood that the brake cable may also be designed, as a whole, as a linkage or as a hydraulic connection to brake cylinders.

What is claimed is:

1. A parking brake for a motor vehicle, the parking brake comprising:
    a lever holder;
    a brake actuation lever disposed in an articulated manner on said lever holder;
    a brake cable;
    a coupling unit for tensioning said brake cable when the brake actuation lever is displaced;
    a locking device for holding said brake actuation lever in a locking position; and
    a four-bar mechanism for coupling the brake actuating lever with the lever holder in an articulated manner, the four-bar mechanism comprising two nonparallel links for linking said brake actuation lever with said lever holder, wherein each of the two nonparallel links is pivotably coupled to the brake actuating lever and wherein each of the two links is directly mounted at the lever holder via a joint in a pivotable manner.

2. The parking brake as claimed in claim 1, wherein said coupling unit is disposed on one of said two nonparallel links.

3. The parking brake as claimed in claim 2, wherein one of said two nonparallel links is a rear link having an articulation in said lever holder and wherein said coupling unit is disposed on an extension of said rear link, and is pivotable about said articulation of the rear link in said lever holder.

4. The parking brake as claimed in claim 3, wherein said locking device comprises a latching unit wherein said latching unit is mounted on said rear link, and wherein said latching unit is mounted at an articulation of said coupling unit and said rear link in said lever holder.

5. The parking brake as claimed in claim 2, wherein said locking device comprises a latching unit and a toothing, wherein said latching unit is disposed on one of said links and is pretensioned towards said toothing.

6. The parking brake as claimed in claim 5, wherein one of said latching unit and said toothing is mounted on a same link as said coupling unit.

7. The parking brake as claimed in claim 1, further comprising a toothed element for said locking device disposed in a region of said lever holder.

8. The parking brake as claimed in claim 1, wherein said two links are disposed, offset to one another, in such a way that they can pivot past to each other.

9. The parking brake as claimed in claim 1, wherein said lever holder comprises two lateral walls disposed essentially vertically, and wherein at least one of said two links is held between said two lateral walls.

10. The parking brake as claimed in claim 1, wherein said locking device releasably fixes said two links in relation to one another.

11. The parking brake as claimed in claim 1, further comprising a release knob disposed in an end region of said brake actuation lever and a compression spring, and wherein the locking device includes a release device coupled to the actuating knob via the compression spring.

12. The parking brake as claimed in claim 1, wherein said brake actuation lever comprises an essentially convex handle disposed essentially transversely to said lever holder.

13. The parking brake as claimed in claim 1, wherein said brake actuation lever is capable of being operated by hand.

14. The parking brake as claimed in claim 1, wherein said brake actuation lever is capable of being operated by foot.

15. A parking brake for a motor vehicle, the parking brake comprising:
    a lever holder;
    a brake actuation lever disposed in an articulated manner on said lever holder;
    a brake cable;
    a coupling unit for tensioning said brake cable when the brake actuation lever is displaced;
    a locking device for holding said brake actuation lever in a locking position; and
    a four-bar mechanism for coupling the brake actuating lever with the lever holder in an articulated manner, the four-bar mechanism comprising two nonparallel links for linking said brake actuation lever with said lever holder,
    wherein each of the two non-parallel links is pivotably coupled to the brake actuating lever,
    and wherein each of the two links is directly mounted at the lever holder via a joint in a pivotable manner;
    wherein said locking device comprises a latching unit and a toothing, wherein said latching unit is arranged on one of said links; and
    wherein one of said latching unit and said toothing is mounted on the same link on which said coupling unit is provided.

16. A parking brake for a motor vehicle, the parking brake comprising:
    a lever holder;
    a brake actuation lever disposed in an articulated manner on said lever holder;
    a brake cable;
    a coupling unit for tensioning said brake cable when the brake actuation lever is displaced;
    a locking device for holding said brake actuation lever in a locking position; and
    a four-bar mechanism for coupling the brake actuating lever with the lever holder in an articulated manner, the four-bar mechanism comprising two nonparallel links for linking said brake actuation lever with said lever holder,
    wherein each of the two non-parallel links is pivotably coupled to the brake actuating lever,
    wherein each of the two links is directly mounted at the lever holder via a joint in a pivotable manner; and
    wherein one of said two nonparallel links is a rear link, said rear link having an articulation on said lever holder, wherein said coupling unit for said brake cable is arranged on an extension of said rear link, and wherein said coupling unit is pivotable about said articulation of the rear link in said lever holder, and
    wherein said locking device comprises a latching unit and a toothing, wherein one of said latching unit and toothing is mounted on said rear link, and wherein one of said latching unit and said toothing is pivotable about said articulation of said rear link in said lever holder.

* * * * *

UNITED STATES PATENT AND TRADEMARK OFFICE
CERTIFICATE OF CORRECTION

PATENT NO. : 7,017,442 B2 Page 1 of 1
APPLICATION NO. : 10/297866
DATED : March 28, 2006
INVENTOR(S) : Markus Böhm It is certified that error appears in the above-identified patent and that said Letters Patent is hereby corrected as shown below:

Column 1, after line 63 the following paragraph should be inserted:
    A parking brake for a motor vehicle includes a lever holder, a brake actuation lever disposed in an articulated manner on the lever holder, a brake cable, and a coupling unit for tensioning the brake cable when the brake actuation lever is displaced. The parking brake also includes a locking device for holding the brake actuation lever in a locking position, and a four-bar mechanism including two nonparallel links for linking the brake actuation lever with the lever holder.

Signed and Sealed this

Fifteenth Day of August, 2006

JON W. DUDAS
*Director of the United States Patent and Trademark Office*